United States Patent
Decker et al.

(10) Patent No.: US 6,281,984 B1
(45) Date of Patent: *Aug. 28, 2001

(54) ENHANCED SYSTEM, METHOD AND PROGRAM FOR CONVERTING AN EXTERNALLY DEFINED FOUR DIMENSIONAL COLORANT (CMYK) INTO AN EQUIVALENT FOUR DIMENSIONAL COLORANT DEFINED IN TERMS OF THE FOUR INKS (C'M'Y'K') THAT ARE ASSOCIATED WITH A GIVEN PRINTER

(75) Inventors: William Chesley Decker, Longmont; Ho Chong Lee, Boulder; Jack Louis Zable, Niwot, all of CO (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/823,731

(22) Filed: Mar. 25, 1997

(51) Int. Cl.$^7$ .................................................. B41B 15/00
(52) U.S. Cl. ..................................... 358/1.9; 358/529
(58) Field of Search ........................... 395/109; 358/518, 358/1.17, 1.9, 1.6, 1.1, 504, 515, 529, 530, 520, 521, 522; 345/154; 382/162

(56) References Cited

U.S. PATENT DOCUMENTS

| | | | |
|---|---|---|---|
| 5,121,196 | 6/1992 | Hung | 358/75 |
| 5,243,414 | 9/1993 | Dalrymple et al. | 358/500 |
| 5,323,249 | 6/1994 | Liang | 358/518 |
| 5,377,025 | 12/1994 | Spaulding et al. | 358/518 |
| 5,481,380 | 1/1996 | Bestmann | 358/504 |
| 5,483,360 | 1/1996 | Rolleston et al. | 358/518 |
| 5,491,568 | * 2/1996 | Wan | 358/518 |
| 5,553,199 | * 9/1996 | Spaulding et al. | 395/109 |
| 5,572,632 | * 11/1996 | Laumeyer et al. | 358/1.17 |
| 5,579,031 | * 11/1996 | Liang | 345/154 |
| 5,619,427 | * 4/1997 | Ohkubo | 358/518 |
| 5,687,000 | * 11/1997 | Nakaoka | 358/518 |
| 5,699,489 | * 12/1997 | Yokomizo | 395/109 |
| 5,717,507 | * 2/1998 | Vondran, Jr. | 358/518 |
| 5,719,956 | * 2/1998 | Ogatsu et al. | 382/167 |
| 5,801,854 | * 9/1998 | Naylor, Jr. | 382/167 |
| 5,859,928 | * 1/1999 | Noh | 382/172 |
| 5,881,211 | * 3/1999 | Matsumura | 395/109 |

FOREIGN PATENT DOCUMENTS 8-116456   5/1996   (JP) ................................. H04N/1/46

* cited by examiner

Primary Examiner—David Moore
Assistant Examiner—King Y. Poon
(74) Attorney, Agent, or Firm—Marilyn Smith-Dawkins; David W. Victor; Konrad Raynes & Victor

(57) ABSTRACT

A unique combination of four colorants (C'M'Y'K') of a given printer that is equivalent to an externally defined four colorant combination (CMYK) by having the same color values (e.g., L*a*b* values). A fourth colorant, e.g., black, (K) of the externally defined four colorant combination is mapped to an equivalent fourth colorant (K') of the printer by matching optical density, reflectance, L* or similar color value. The L* value is found for various percentages of the fourth colorant of the printer by printing varying percentages of the fourth component and measuring its L*a*b* values and, assuming a* and b* are near zero, using the L* value. These values are inputted into an interpolation program. Then, patches of varying percentages of each one of the three color components of the printer (CMY) are printed out at varying percentages. The L*a*b* values for each patch are measured and inputted into an inversion/interpolation program along with the corresponding percentages of colorants of each patch. The externally defined four component colorant having L*a*b* values also used in the inversion/interpolation program, which creates a color transform table from CMY with various percentages of K of the externally defined four dimensional colorant to C'M'Y' with various percentages of K' of the four dimensional colorant of the printer by matching L*a*b* values.

33 Claims, 6 Drawing Sheets

ENHANCED SYSTEM, METHOD AND PROGRAM FOR CONVERTING AN EXTERNALLY DEFINED FOUR DIMENSIONAL COLORANT (CMYK) INTO AN EQUIVALENT FOUR DIMENSIONAL COLORANT DEFINED IN TERMS OF THE FOUR INKS (C'M'Y'K') THAT ARE ASSOCIATED WITH A GIVEN PRINTER

CROSS REFERENCE TO RELATED APPLICATION

This application is related by common inventorship and subject matter to copending patent application No. Ser. No. 08/823,596, entitled "A System, Method, and Program For Converting Three Dimensional Colorants To More Than Three Dimensional Colorants" filed on even date herewith, assigned to the Assignee hereof and entirely incorporated herein by this reference.

This application is related by common inventorship and subject matter to copending patent application No. Ser. No. 08/823,597 entitled "A System, Method, and Program For Converting An Externally Defined Four Dimensional Colorant (CMYK) Into An Equivalent Four Dimensional Colorant Defined In Terms Of The Four Inks (C'M'Y'K') That Are Associated With A Given Printer" filed on even date herewith, assigned to the Assignee hereof, and entirely incorporated herein by this reference.

This application is related by common inventorship and subject matter to copending patent application No. Ser. No. 08/832,774 entitled "A System, Method, and Program For Converting An Externally Defined Four Dimensional Colorant (CMYK) Into An Equivalent Four Dimensional Colorant Defined In Terms Of The Four Inks (C'M'Y'K') That Are Associated With A Given Printer By Using A Three Dimensional To Four Dimensional Conversion Process" filed on even date herewith, assigned to the Assignee hereof and entirely incorporated herein by this reference.

BACKGROUND OF THE INVENTION

1. Field of the Invention

This invention relates to color printing, and more specifically, to converting a four dimensional color (CMYK), defined in terms of a standard or another printer, into an equivalent four dimensional color defined in terms of the colors (i.e., inks, toners, etc.) that are uniquely associated with a printer that is to perform the actual printing.

2. Description of the Related Art

For additive color processes such as used in display monitors, red, green, and blue are primary colors. In theory, mixing red, green, and blue light in various combinations can produce any color. For example, cyan is a mixture of green and blue and magenta is a mixture of red and blue. Black is the absence of any red, green, or blue; while white contains all three. A display monitor involves an additive process of light, and therefore, any color it produces can be defined in terms of red (R), green (G), and blue (B).

In a printing process, inks are typically deposited on white paper which already reflects the full amount of red, green, and blue. Instead of adding red, green and blue (RGB) together to produce any color, quantities of red, green, and blue are removed to produce a desired color. To do this, filters or inks have to be produced which filter individual primary colors, while not affecting the other two. The filter colors which accomplish this are the colors which are the complement of the primary colors. For example, yellow is the complement of blue. A blue filter, one which filters out blue light, passes red and green and thus appears yellow. Yellow ink can be thought of as an ink which removes blue. Thus, the complement of blue is yellow; the complement of red is cyan; and the complement of green is magenta. As such, cyan, magenta, and yellow are the primary colors in the subtractive color system and are known as the process colors in the printing industry.

Theoretically, with only three colors of ink: cyan (C), magenta(M) and yellow (Y), a printer could print any color. White can be obtained by putting no ink on the paper; and black can be obtained by putting cyan, magenta, and yellow on the paper, blocking all light. Realistically, however, the color obtained when placing cyan, magenta, and yellow on paper may not be pure black. It may be brownish. Consequently, black ink is typically added to the printing process color set. The black ink not only insures a richer black color, but it also reduces the amount of ink that has to be used to produce most colors. For example, if at any one place on the paper, quantities of C, M, and Y are placed, there will be a gray component which can be removed and replaced with black. This reduces the total amount of ink on the paper and produces better grays and blacks. In addition, it increases the gamut of the color set.

As a theoretical example of this process called black substitution or gray component removal, consider the following:

A color requires
Cyan=20%
Magenta=40%
Yellow=60%

In theory, the above color has a 20% gray component, the least common denominator. As such, 20% of each color could be removed and replaced with 20% black. The following will theoretically produce the same color.

New color mix
Cyan=0%
Magenta=20%
Yellow=40%
Black=20%

In the above example, 120 units of ink are replaced with 80 units of ink. Thus ink is saved. Colored inks usually cost more than black ink; thereby saving even more.

As shown above, color can be expressed in several ways. A color can be expressed in terms of percents of RGB (red, green, blue), CMY, (cyan, magenta, yellow) or CMYK (cyan, magenta, yellow, black). None of these color spaces, as they are called, are defined as to what color is produced by mixing combinations of each. Generally, these color spaces are referred to as being device dependent, since the color produced by a given CMYK mix on one printer will not produce the same color on another.

An attempt has been made in the United States to standardize the process color inks so that the colors can be predicted. A standard called SWOP (Specification for Web Offset Publication) has been published which standardized the process ink colors. Recently, the standard has been taken a step further and 928 combinations of CMYK have been defined as to what color will result in a device independent color space (CIE XYZ or CIE L*a*b*). In Europe, a standard called Euroscale has been developed for four different paper surfaces. SWOP and Euroscale are very close, but not exactly the same.

In 1931, the organization called the Commission Internationale L'Eclairge (International Commission of Lighting), the CIE, met to try to establish a system of device independent color, color based on human sight. While attempting to define RGB, problems arose which persuaded the members to process the data through a matrix transform which produced a color space called CIE XYZ or XYZ. Since the XYZ color space is based on the human perception of color, any two different colors, even though the spectrum of these two colors may be different, will be perceived as the same color by a human if the XYZ values are the same under given lighting conditions.

From the XYZ color space, additional color spaces have been derived. One of these is called CIEL*a*b*, pronounced C Lab, or L*a*b*. This color space is based on XYZ of the color referenced to XYZ of the light source or paper. Most specifications such as the SWOP standard are specified in terms of XYZ and L*a*b* under a light source such as daylight D50. It is a three component color space with each color specified in terms of L*, a*, and b*. L* specifies the lightness; and the hue and saturation are determined from the values of a* and b*.

As previously discussed, a display monitor involves an additive process of light, and therefore, any color it produces can be defined in terms of RGB. However, a printing process is a subtractive process since it is printing on white paper, and therefore, color printers use cyan (C), magenta (M), and yellow (Y) or cyan, magenta, yellow and black (K), i.e., CMY or CMYK, to produce various colors. However, input files, such as a display monitors, scanners or other information used to print images are typically defined using RGB. Some input files can be defined in terms of CMY or CMYK. Input files may also be defined in device independent terms such as XYZ or L*a*b. Therefore, a conversion process has to take place in order to convert RGB, XYZ, or L*a*b* of an input file into CMY or CMYK for printing.

If the input file is RGB, XYZ, or L*a*b*, it must be converted to CMY or CMYK. If the input file is CMY, the printer could print with CMY, but it may be more desirable to print using CMYK. If the input file is CMYK, no conversion is necessary.

3D to 3D Conversions

3-D color tables (such as CMY-to-L*a*b*) and transformations among 3-D color spaces are straight forward and unambiguous or unique within the color gamut of the printer; and therefore, inversion schemes (e.g. from L*a*b* to CMY) are available. These schemes involve measurements of color patches of varied color amounts at specified intervals (e.g. creating a 9×9×9 matrix, i.e., 729 patches) to form a CMY lattice and a corresponding L*a*b* (or other color space) lattice (corresponding to CMY 9×9×9 for the example given here). These primary lattices can be denoted by (CMY)p and (L*a*b*)p. An interpolation method is used to establish one-to-one correspondence between points in these lattices. The so called "color rendering dictionaries" are constructed using such interpolation algorithms. If such rendering dictionaries have been established, finding CMY for a given L*a*b value becomes a simpler task.

L*a*b* to CMY Conversion

Coordinates for device independent color space are specified in L*a*b*. However, printers typically use CMY colors. It is therefore necessary to convert from L*a*b* to CMY. Converting to CMY involves a three dimensional (3D) to three dimensional (3D) conversion process. It should be noted that well known, commonly used, methods can be used to perform 3D to 3D conversions, such as L*a*b* to CMY.

For example, a L*a*b* to CMY transfer involves making print sample patches using the printer for which the conversion is desired. The print patches are made up of combinations of C, M, and Y. Typically, there are nine patches of each (making a 9×9×9 sample layout having 729 patches) with each color at 0%, 12.5%, 37.5%, 50%, 62.5%, 75%, 87.5%, and 100%. For each one of the 729 patches the exact percent of cyan, magenta, and yellow is known. Then, each print sample, i.e., patch, is measured and its CIE L*a*b* calculated. A table is created having various percentages of CMY with its corresponding L*a*b* value. To express C, M and Y in terms of equal increments of L*a*b*, known inversion and interpolation techniques are employed. For any given L*a*b* value received as input, that L*a*b* value is located in the table and the corresponding percentages of CMY are found. If the same L*a*b* value is not in the table, interpolation is used or out-of-gamut mapping is used. Out-of-gamut mapping occurs if the L*a*b* value is beyond the volume or color space of colors that a printer is able to produce. Any L*a*b* value that lies within this volume is something that can actually be accurately reproduced by the printer. Since any given printer has its limitations and cannot print every possible color, out-of-gamut means that a given L*a*b* is outside the capability of the printer. There are many well-known out-of-gamut mapping techniques. Basically, these techniques try to get to the point on the surface of the color volume of the printer that is the closest color match.

RGB to CMY Conversion

Converting from RGB to CMY merely involves a process that represents the relationship between complementary colors. The subtractive color primaries cyan, magenta, and yellow are the complements of the additive primaries red, green, and blue. Therefore, in theory, the conversion is:

cyan=1.0−red magenta=1.0−green yellow=1.0−blue

For example, a color that is 0.2 red, 0.7 green, and 0.4 blue can also be expressed as 1.0−0.2=0.8 cyan, 1.0−0.7=0.3 magenta, and 1.0−0.4=0.6 yellow.

3D to 4D Conversions

CMY to CMYK conversion

Converting from CMY to CMYK involves using black generation and under color removal to generate a black component. Under color removal reduces the amount of cyan, magenta, and yellow components to compensate for the amount of black that was added by the black generation. The percentage of black used is the minimum percentage that is used by cyan, magenta or yellow. The altered amount of CMY that is then used is the original amount minus the percentage amount used for black.

For example, for an input file defined in CMY, the conversion to C'M'Y'K' is as follows:

K=min (C,M,Y)

C'=C−K

M'=M−K

Y'=Y−K

For this conversion, it is assumed that the inks are a perfect dye such that a mixture in equal amounts of CMY will produce black or a perfect gray, i.e., a block die. The above illustrates one way to convert CMY to CMYK.

A side effect from converting from CMY to CMYK is that the gamut may be reduced, i.e., the number of colors that are produced (the color space) may be reduced, due to loss of hue. This side effect can be compensated for by using an under color addition process. The under color addition process regains lost hues and expands the gamut. This process results in new percentages of CMYK noted below as C"M"Y"K". The process uses the following well-known formulas from classical theory:

$$C'' = \frac{C'}{1-K} = \frac{C-K}{1-K}$$

$$M'' = \frac{M'}{1-K} = \frac{M-K}{1-K}$$

$$C'' = \frac{C'}{1-K} = \frac{C-K}{1-K}$$

$$K'' = K' = K$$

RGB to CMYK Conversion

A combination of processes including the RGB to CMY conversion and the CMY to CMYK conversion can be used to convert from RGB to CMYK.

L*a*b* to CMYK Conversion

This conversion involves the 3D interpolation scheme and out-gamut mapping scheme discussed above for transforming L*a*b* to CMY. This involved creating CMY patches (e.g., 9×9×9), measuring for L*a*b* values and interpolating, if necessary, to get a CMY value for a given L*a*b* input value. Then the above process for converting CMY to CMYK can be used.

The problem with the above conversion processes, especially the ones that convert CMY to CMYK, i.e., a 3D to 4D conversion, is that these processes are based on theoretical colors and color relationships. A printer may not be capable of producing such theoretical colors.

In addition, since printers typically have four colors, CMYK, for printing, but input files are typically defined using three color values (e.g., RGB, L*a*b*), an equivalent color set of more than three colors must be found for every color obtained with combinations of three primary colors. Transforming a three dimensional system to four or higher dimensions provides no unique solution. The well-known simple scheme described above is based on the ideal dies known as block dies which yields perfect black or grey (w/o hue) whenever equal amounts from C, M, and Y are overprinted over a given area. Then, for any given set of 3 primaries, an equal amount is removed from each color component and the same amount of black can be added without changing the color value. The amount of ink saved is twice the amount of black added. The amount of CMY replaced can vary from zero to the lowest of the three colorants—a fact which indicates that this process is not unique. For real colorants, combining equal amounts of three colorants will not result in ideal grey/black. Thus, the choice of black replacement becomes ambiguous.

U.S. patent application Ser. No. 08/823,586 entitled "A System, Method, and Program For Converting Three Dimensional Colorants To More Than Three Dimensional Colorants" filed on even date herewith, assigned to the Assignee hereof and entirely incorporated herein by this reference, discloses a technique for converting from three colorants to four or more colorants. The technique takes into account the colors and L*a*b* values of the colors that a given printer is actually capable of printing. The technique also uses a fourth color substitution process that results in an unambiguous fourth color replacement percentage amount.

In some situations it is desirable to convert a four color combination (e.g., CMYK) to an equivalent four color combination of the same colors (CMYK). For example, the printing press industry has their own standard and specification for CMYK (e.g., SWOP standard). Each different standard and specification of CMYK will result in different L*a*b* values for a same percentage amount of CMYK. In addition, the L*a*b* values for a given CMYK combination defined by a standard will be different for that same CMYK combination that is printed by any given printer. This is because the various toners or inks used by printers will produce their own different L*a*b* values. Toners and inks having different formulations will produce differing L*a*b* values. Any color combination (e.g., CMYK) that is specified as having certain color values (e.g., L*a*b* values) which do not take into consideration the characteristics of the colors of the printer that is to perform the printing, is referred to herein as being externally defined. For example, an externally defined color combination (e.g., CMYK) may be specified by the SWOP standard, any other standard, or by the characteristics (inks/toners) of another printer (as would be done for a proofing application). In many cases, a printer job will be received in which the four dimensional colorant (CMYK) is externally defined. Therefore, the printer that is to perform the printing must convert the received externally defined CMYK values into equivalent CMYK values that take into consideration the colors (i.e., inks, toners, etc.) and capabilities of the given printer. A CMYK of a printer (C'M'Y'K') is equivalent to an externally defined CMYK if the L*a*b* values are the same.

Therefore, it is desirable to convert an externally defined CMYK to its corresponding L*a*b* values and to use these L*a*b* 0 values to find an equivalent C'M'Y'K' combination for a given printer. This transformation can be depicted as $(CMYK)_{STD} \rightarrow (L*a*b*)_{STD}(L*a*b*)_{PRTR} \rightarrow (C'M'Y'K')_{PRTR}$ The problem is that there is not a one-to-one mapping from L*a*b* to CMYK. That is, there is not a unique combination of CMYK for a given L*a*b*.

SUMMARY OF THE INVENTION

It is therefore an object of this invention to convert an externally defined four dimensional colorant (CMYK) into an equivalent four dimensional colorant (C'M'Y'K') that takes into consideration the colors and capabilities of the given printer that is to perform the printing functions.

It is a further object of this invention to find a unique and equivalent combination of four colors of a printer (C'M'Y'K') from L*a*b* values specified for an externally defined four dimensional colorant (CMYK).

The system, method, and program of the preferred embodiment of this invention determines a unique combination of C'M'Y'K' of a given printer that is equivalent to an externally defined CMYK by having the same L*a*b* values.

Another technique for doing this is disclosed in copending patent application No. Ser. No. 08/832,597 entitled "A System, Method, and Program For Converting An Externally Defined Four Dimensional Colorant (CMYK) Into An Equivalent Four Dimensional Colorant Defined In Terms Of The Four Inks (C'M'Y'K') That Are Associated With A Given Printer" filed on even date herewith, assigned to the Assignee hereof, and entirely incorporated herein by this reference.

The preferred embodiment of this invention and the preferred embodiment of the above described copending application both use the L*a*b* values associated with each CMY combination for each K value of the externally defined CMYK color combinations. These L*a*b* values may be published as a standard or they can be measured from patches printed out using inks that meet the externally defined specification. The L*a*b* values and corresponding CMY values at each K value are inputted into an inversion program.

Both preferred embodiments also map an externally defined K value to an equivalent K' value of the printer through matching the L* value, optical density, reflectance, or other equivalent color value. For convenience in describing these preferred embodiments, L* will be used for the color value. First, the L* value is found, such as from the tables published for a given standard, for each externally defined K value where C=0, M=0, and Y=0. Then, the given printer prints out a series of greyscale fourth color component (e.g., black) (K') patches for increments of percentages of black (K') ranging from 0% to 100%. The L* value for each of these greyscale patches is measured. The L* value and the corresponding externally defined K value are inputted into an interpolation program. The measured L* value and the corresponding K' value of each printed greyscale patch is also inputted into an interpolation program. For any given externally defined K value, an equivalent K' value can be determined from the interpolation program by matching the same corresponding L* value to both values.

In the preferred embodiment of this invention, the mapped K' value of each externally defined K value is used to print out various combinations of varying predetermined percentages of C'M'Y' patches. For example, a first 9×9×9 matrix of combinations of C'M'Y' at varying percentages of 0%, 12.5%, 25%, 37.5%, 50%, 62.5%, 75%, 87.5%, and 100% would be printed out using K'=0. A second 9×9×9 matrix of C'M'Y' may be printed out at K'=0.11, if K' was equivalent to K=0.1 by having the same L* value. A third 9×9×9 matrix of C'M'Y' would be printed out K'=0.21, if K' was equivalent to K=0.2 by having the same L* value.

This would be repeated for each K' value equivalent by its L* value to an externally defined K value. Each patch is then measured for its L*a*b* values. The values for each C'M'Y' are inputted into an inversion/interpolation program along with the corresponding measured L*a*b* values for each group corresponding to a respective K' value used in actually printing the given C'M'Y combination.

To convert a given externally defined CMYK combination to a C'M'Y'K' combination that when printed by the given printer will result in the same L*a*b* values as the CMYK combination, the preferred embodiment of this invention will perform the transformation as follows. An inversion/interpolation program is used which has as its parameters the inputted values C'M'Y' along with the corresponding measured L*a*b* values for each group corresponding to a respective K' value. It also has as its parameters the inputted values of each externally defined CMY combination and its corresponding L*a*b* values for each K value. For any given externally defined CMYK, the inversion/interpolation program will find the L*a*b* values corresponding to CMY with K, and using those L*a*b* values find a combination C'M'Y' with a K' where the K' corresponds to the K of the externally defined CMYK combination by their L* values.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENT

One solution to the above described problem can utilize a conversion technique that converts L*a*b* values into equivalent C'M'Y'K' values for a given printer as disclosed in U.S. patent application Ser. No. 08/823,734 entitled "A System, Method, and Program For Converting An Externally Defined Four Dimensional Colorant (CMYK) Into An Equivalent Four Dimensional Colorant Defined In Terms Of The Four Inks (C'M'Y'K') That Are Associated With A Given Printer By Using A Three Dimensional To Four Dimensional Conversion Process" filed on even date herewith, assigned to the Assignee hereof and entirely incorporated herein by this reference. For each L*a*b* in a standard table or from another external specification, a corresponding C'M'Y'K' combination for a given printer is found by using the L*a*b*->CMY->CMYK conversion technique disclosed therein.

Another solution to the above described problem is disclosed in copending patent application Ser. No. 08/823,597 entitled "A System, Method, and Program For Converting An Externally Defined Four Dimensional Colorant (CMYK) Into An Equivalent Four Dimensional Colorant Defined In Terms Of The Four Inks (C'M'Y'K') That Are Associated With A Given Printer" filed on even date herewith, assigned to the Assignee hereof and entirely incorporated herein by this reference.

The system, method, and program of this invention uses different techniques, than those described in the above described co-pending patent applications, to convert an externally defined four dimensional colorant (CMYK) into an equivalent four dimensional colorant (C'M'Y'K') which has the same L*a*b* values as the externally defined CMYK. The equivalent C'M'Y'K' results from the actual colors and capabilities of the given printer that is to perform the printing functions. A preferred embodiment is shown, described, and claimed in which the transform is performed by preserving the characteristics of the fourth (e.g., black) component.

Figure 1A:
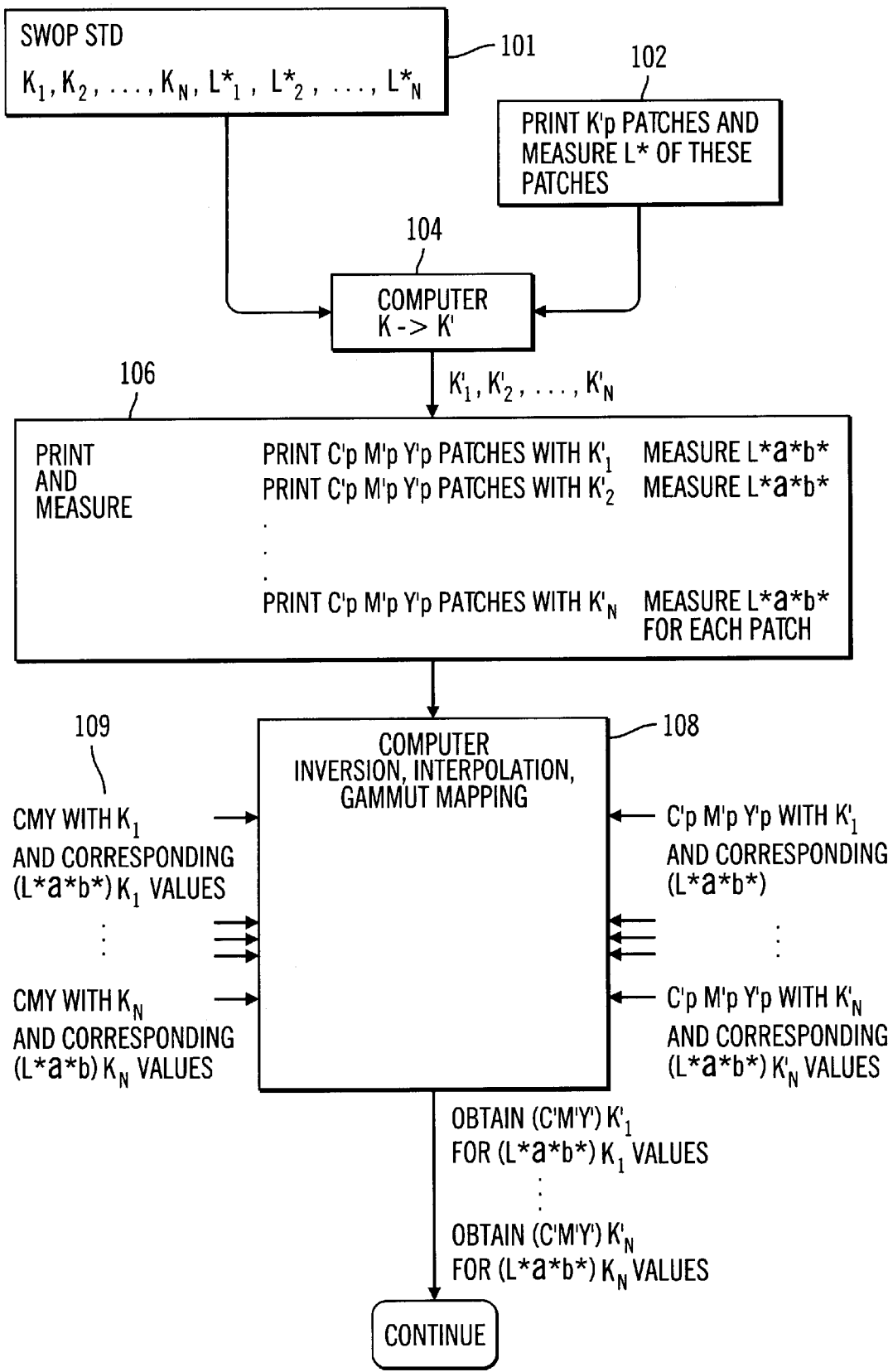
FIGS. 1A and 1B illustrate a flow chart showing the process steps of this invention.
Figure 1B:
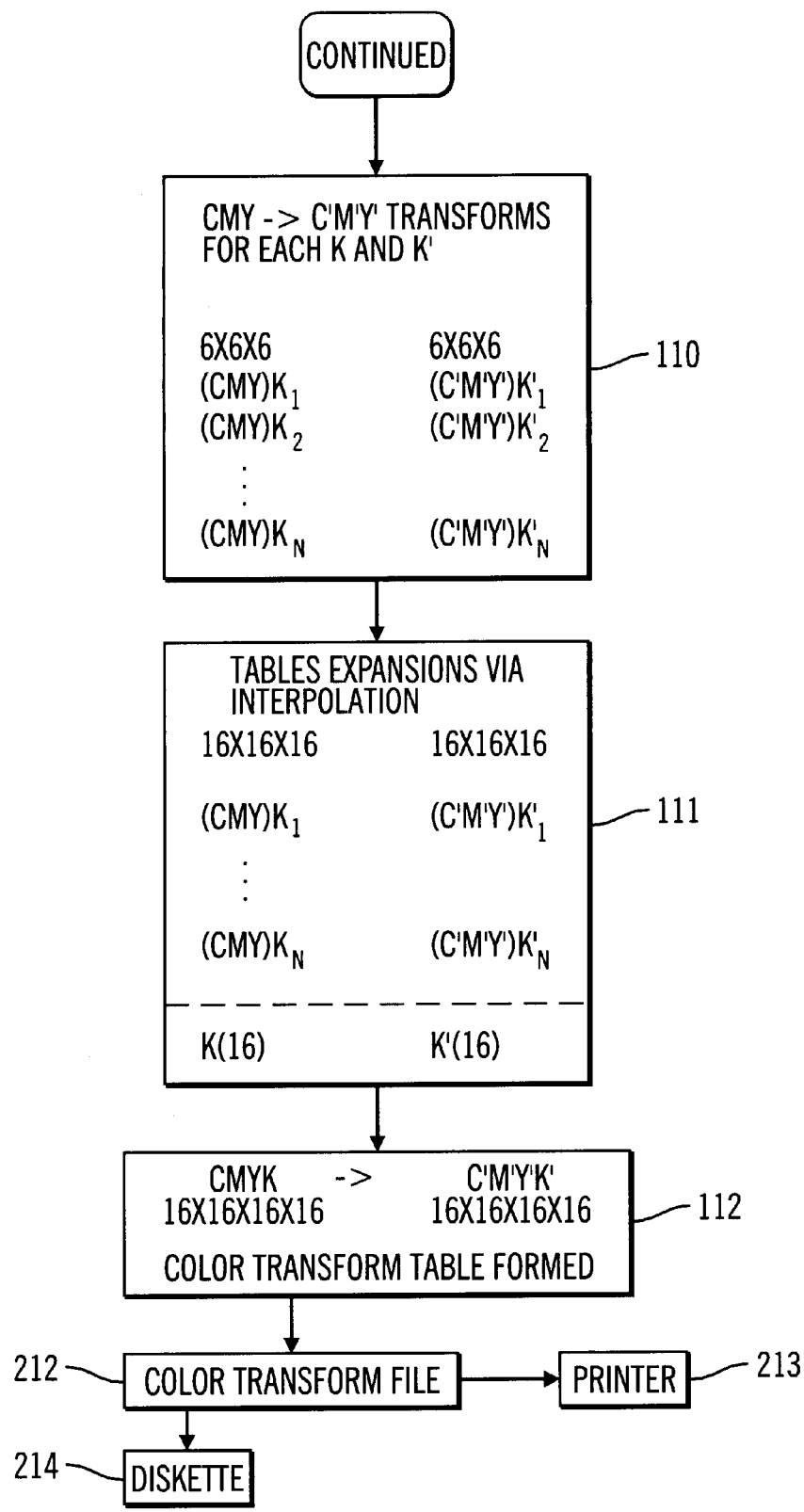

The preferred embodiment described herein incorporates the following techniques as shown in FIGS. 1A and 1B. First, L*a*b* values are obtained for predetermined (i.e., known) combinations of varying percentages of each of the four components of CMYK that are externally defined, 109. These values may be obtained from a specification such as through published tables of the externally defined CMYK. For example, the SWOP standard publishes a table of L*a*b* values for varying percentages of CMYK. If such a table is not available, printed patches of predetermined combinations of varying percentages of each of the four components of CMYK that are externally defined may have to be obtained, such as from a printing press using printer's inks which match the standard. The L*a*b* values of each printed patch are then measured using a spectrophotometer or other color value measuring device. These L*a*b* values are then correlated with their corresponding CMYK values via a look up table and inversion/interpolation program.

It should be noted that some standards (e.g., SWOP) will publish tables having L*a*b* values for various combinations of CMY with K at a first value, then the same various combinations of CMY with K at a second value, etc. As such, the CMY values are varied independently of the K value. For example, C,M, and Y may have various combinations of 0%, 10, 20%, 40%, 70%, and 100%, resulting in a 6×6×6 matrix of CMY combinations, or 216 CMY combinations for each K value. For example, a first group of 216 CMY combinations at K=0, a second group of 216 CMY combinations at K=0.20, a third group of 216 CMY combinations at K=0.40, etc. The standard provides L*a*b* values for each CMY combination at each K value.

In this preferred embodiment, with reference to FIG. 1A and 1B, an equivalent K' for a given printer is converted or transformed, 104, from a given externally defined K value 101 by using the following described technique.

The printer prints a series of greyscale fourth colorant (e.g., black) (Kp) patches, 102. Since the values of a* and b* are approximately zero for the greyscale black patches, only the L* value is used for the greyscale black patches.

For a given CMYK, (such as from the SWOP standard), the K value will be examined, e.g., assume K=0.4. One of the SWOP patches, or rows in the published tables, will have C=0, M=0, Y=0, and K=0.4, as the specification exists. The corresponding L* value for that K=0.4 is found from the published tables or measured from a patch created from a printing press using the specified inks. Using this L* value, the percentage of K' of the printer will be determined that equals this L* value. The previously printed greyscale patches having various percentages of black (Kp values) and the corresponding L* values measured for each patch are used to find a percentage of K' of the printer that has the given L* value associated with K. In summary, a K value from the standard (where C=0, M=0, and Y=0) is used along with its corresponding L* value. This L* value is then used to determine a corresponding K' value for the printer. This transformation, from K (SWOP)-to-L*-to-K'(printer) is determined via an interpolation program based upon input of all of the K values from the standard and the corresponding L* value of each K value, and upon input of each printed Kp percentage amount printed by the printer and the corresponding L* value measured for that Kp percentage.

Figure 5:
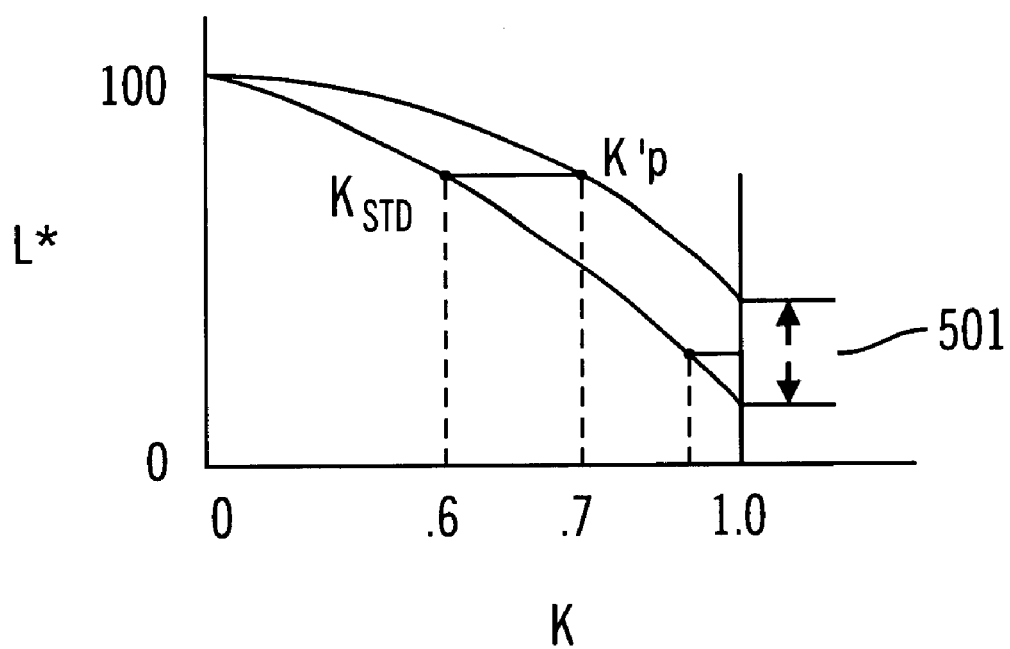
FIG. 5 is a plot, or mapping, of an externally defined fourth color component K and a fourth color component of the printer K'p.

A plot, as shown in FIG. 5, can be made of standard K ($K_{STD}$) and printer K'($K'_P$) from 0% (0) to 100% (1) and the corresponding L* value from 0 to 100. Reflectance could be used instead of L*. Such a plot can be used to find a corresponding K' value for the printer for any given L* value or K value for the standard. It should be noted that the plot shown in FIG. 5 is not drawn to scale but is used herein merely for illustrative purposes. In certain situations, the printer may not be able to print the darkest K of the standard, but it will be matched best with K'=', and the resulting error accepted. The mapped area where this applies is shown as area 501 of FIG. 5. Although the L* values for K and K' will not be the same for this area only, they will be nearly the same in this region. Nevertheless, K and K' in this region will be mapped to each other, i.e., correspond to each other, even though the L* values may not be the same. Nevertheless, the L* values will be nearly the same.

For example, a standard may specify L*a*b* values for various combinations of varying percentages of CMY with predetermined incremental percentage amounts, e.g., 0%, 10%, 20%, 40%, 60%, 80%, and 100%, of K. Therefore, there will be a L* value for each K that equals one of these percentages where C=0, M=0, and Y=0, 101. Using interpolation as described above, the L* value at each one of these K values will result in a converted K' value. For example, if the standard has a specified L* value for C=0, M=0, Y=0, and K=0.20, the converted K' value, (which has the same L* value), for the printer may be K'=0.22. Likewise, for each of the incremental percentages used by the standard for the K value, an equivalent K' value for the printer is determined, 104.

These transformed K' values are used to print out various groups of patches of (CMY(p))k', 106. The first group will have predetermined combinations of varying percentages of cyan, magenta, and yellow at K'=0. Each component of (CMY(p))k' will have a predetermined percentage amount. For example, for cyan, there would be color patches having 0%, 12.5%, 25%, 37.5%, 50%, 62.5%, 75%, 87.5% and 100% of cyan color. Each one of these percentages are combined with these same different percentages of magenta. In addition, each of the 9×9 combinations of cyan and magenta are combined with these same different percentages of yellow to create 9×9×9 color combinations. Although it is not necessary that the same percentage values are used for each color component. Also, there could be any number of different percentage values making any number of 1×m×n color combinations. This first group of 1×m×n color combinations are printed out using K'=0.

A second group of patches are printed out having the same 1×m×n combinations of cyan, magenta, and yellow, but this time the combination also contains a percentage amount of black (K'). There may be any number (M) of different percentage amounts of black that are used. For example, black may have varying percentage amounts of 0%, 10%, 20%, 40%, 60% and 80% as externally defined. If a next incremental percentage amount for the externally defined K is 10%, a K' value for the printer is used that has been transformed from a 10% K of a standard using the conversion process described above for transforming an externally defined K value to a K' value for a printer. For example, if K' was determined to be 0.11, the 1×m×n combinations of cyan, magenta, and yellow printed out by the printer would be printed out with black (K') at 11% instead of at 10%. The L*a*b* of each of these patches are measured to get a transformation relationship from L*a*b*-to-(C'M'Y')k' of the printer but with K'=0.11.

The printer then continues to print out M groups of 1×m×n combinations of cyan, magenta, and yellow. Each one of the M groups of 1×m×n combinations (patches) are printed using a different percentage amount of black. The specific percentage amount of black (K') that is used for a given printer will have the same L* value as the predetermined incremental percentage amount of the externally defined K value.

For example, for an externally defined K having values of 0, 0.10, 0.20, 0.40, 0.60, and 0.80, the corresponding K' value for the printer that results in a same L* value at each of those values where C=0, M=0, and Y=0 may be 0, 0.11, 0.22, 0.45, 0.66, 0.84, respectively.

Each group of 1×m×n (e.g., 9×9×9) patches of (C'M'Y')k' printed by the printer contains a different K' value. Each patch in each group of patches is measured for its L*a*b* values. All of these L*a*b* values are inputted into an inversion/interpolation program 108 to create a look up table, 110. There may be several look up tables created, where one look up table is created for each value of K(K'). Thus,

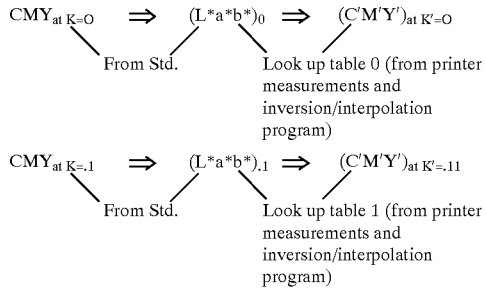

This is combined with

K->L*->K' to form color transform table

CMYK->C'M'Y'K'

A look up table of the color transform with a larger number of nodel points can be derived from the basic look up table by interpolation, 111. Thus, the color transform, CMYK->C'M'Y'K' having, for example, 6×6×6×6 nodel points, 110, can be transformed to one having 16×16×16×16 nodel points via interpolation, 111. Thus,

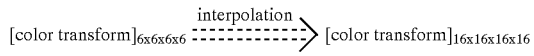

For any given CMY combination at any given K amount, e.g., K=0.20, the corresponding C'M'Y' combination at K'=0.22 having the same L*a*b* as the given CMY combination at K=0.20 can be determined from the inversion/interpolation program.

For example, for an externally defined CMY and K that has a given L*a*b*, the C'M'Y'K' for the printer needs to be determined. If the K value of externally defined CMYK was 0.2, then the L*a*b* values in the group of C'M'Y' combinations having K'=0.22 will be examined to find the associated C'M'Y' values with K'=0.22 that has the same L*a*b* values as the given L*a*b* values for CMY with K.

Figure 2:
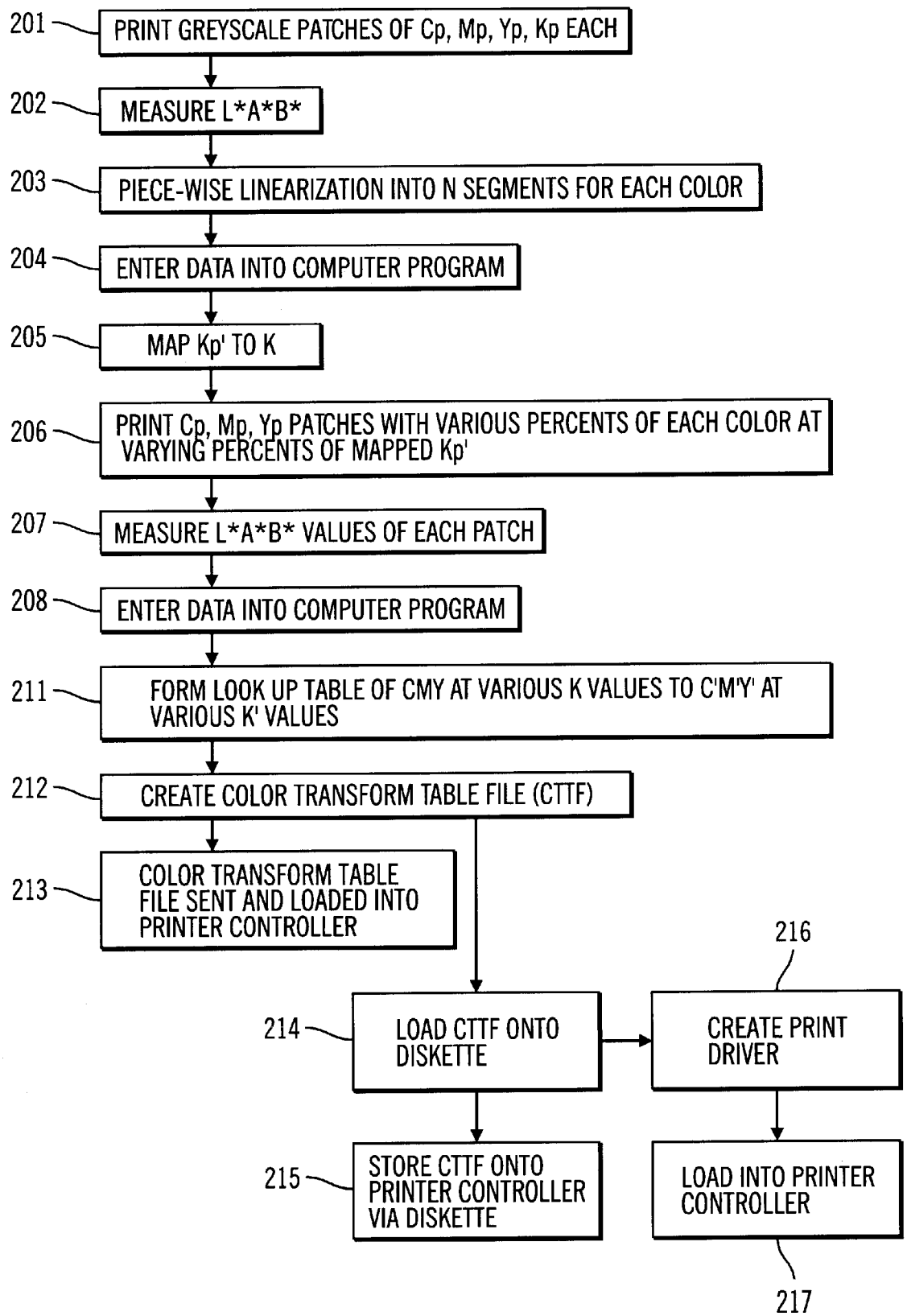
FIG. 2 illustrates a flow diagram of the process for creating a color transform table.

FIG. 2 illustrates a flow diagram of the process for creating a color transform table. First, greyscale patches are printed of each Cp,Mp,Yp,Kp at predetermined intervals such as at 50 equally spaced intervals, for a total of 200, step 201. The L*a*b* of each patch is measured, step 202. Plots are made for each set and intervals into N segments (N=8 in the preferred embodiment) are determined. The best linear fit in each interval for L* as well as a* and b* are sought in this step, step 203. The data is entered into a computer program, step 204. A mapping is made between various printed greyscale values of K' and externally defined K values based on corresponding L* values, step 205. Then (CMY(p))k' patches with various percents of each color (0–100% as determined in step 201) at varying percents of K' that have been mapped to externally defined K values are printed, step 206. The L*a*b* values of each of these (CMY(p))k'patches at each K' value are measured, step 207. This data is then entered into a computer program, step 208.

A look up table is formed of CMY at various K values to (C'M'Y')k' at various K'values, step 211. A color transform table file is created, step 212. The color transform table file can then be sent and loaded into a printer controller 213 or loaded onto a storage medium such as a diskette, step 214. If the color transform table is stored on a storage medium, the color transform table can be permanently stored into the printer controller via the storage medium, or it can be loaded into the printer controller by the print driver as required by the print job, steps 214–217.

Figure 3:
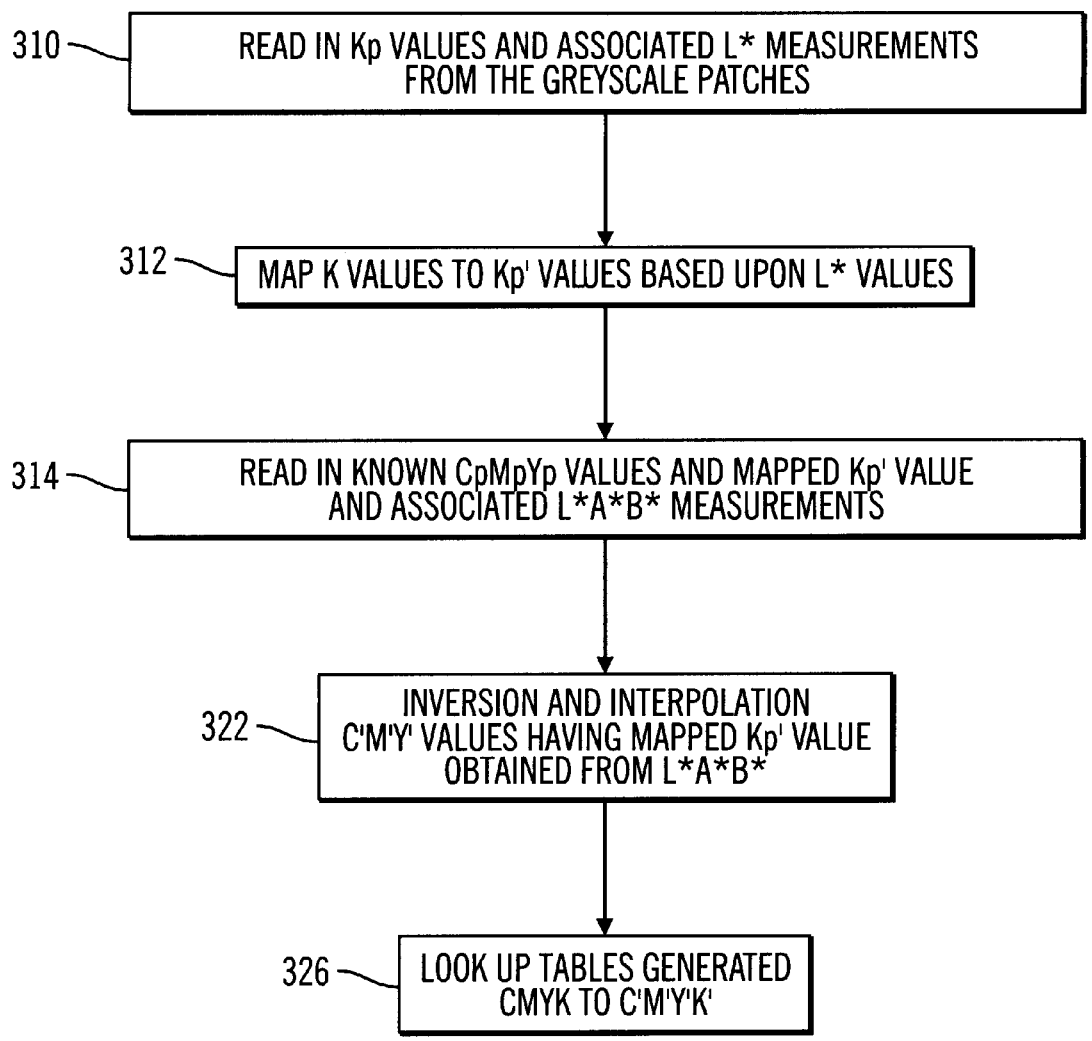
FIG. 3 is a computer program flow diagram for generating a look up table from an externally defined four dimensional color space (CMYK) to an equivalent four dimensional color space of a given printer (C'M'Y'K'), i.e., a color transform.

FIG. 3 is a computer program flow diagram for generating a look up table from an externally defined four dimensional color space (CMYK) to an equivalent four dimensional color space of a given printer (C'M'Y'K'). First, the Kp values and associated L* measurements from the greyscale patches are read in, step 310. Then a mapping is made between the fourth component K' of the printer and a fourth component of an externally defined four component colorant K based upon corresponding L* values, step 312. Then the known (C'M'Y')k' values and mapped K' value from the (C'M'Y')k' patches printed with varying mapped K' values and associated (L*a*b*)k' values are read in, also, step 314. Through inversion and interpolation, C'M'Y' values are obtained, from a group of (C'M'Y')k values having a mapped K' value and L*a*b* values for (C'M'Y')k, in equally spaced increments, step 322. Then, a look up table is generated for CMYK to C'M'Y'K', step 326.

Figure 4:
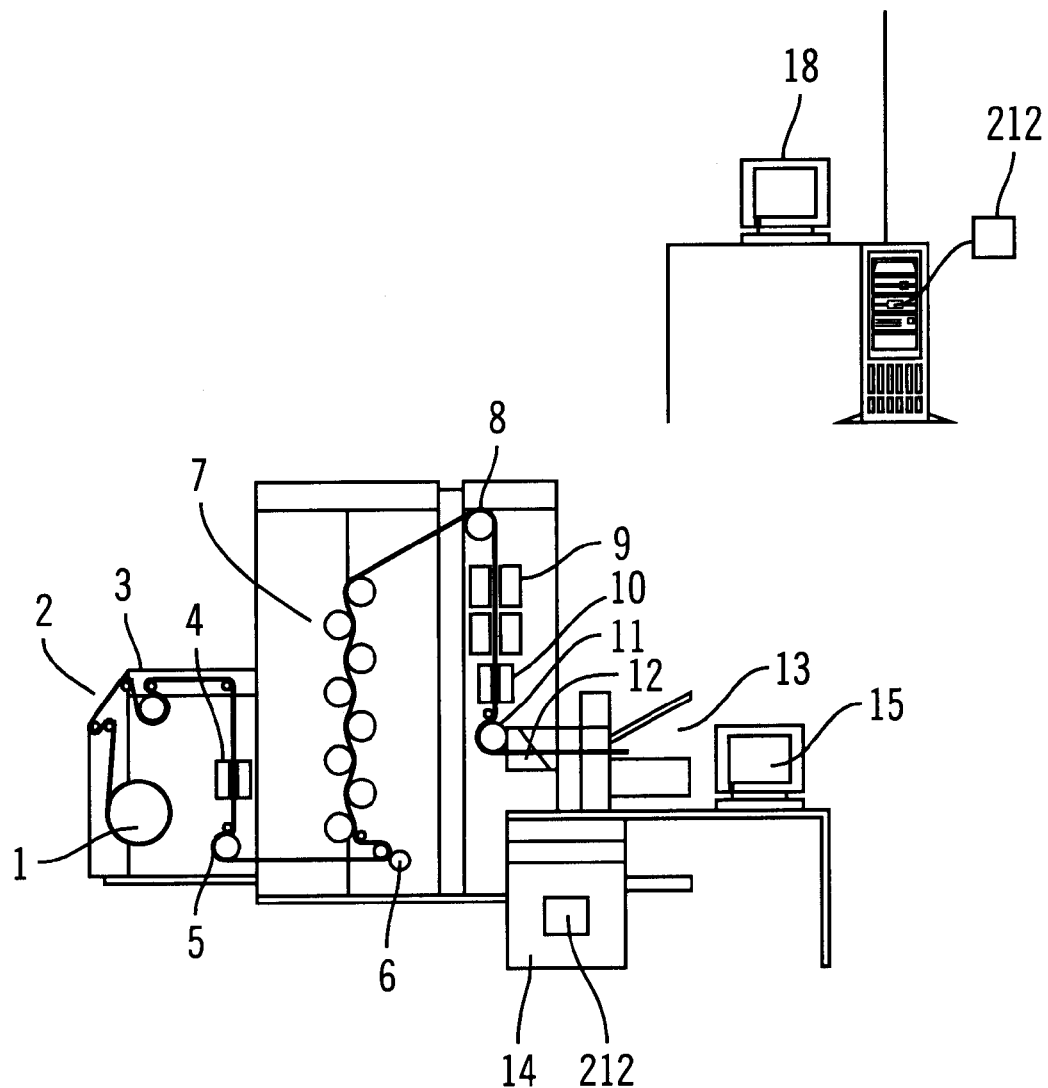
FIG. 4 is a block diagram of a printing system.

FIG. 4 is a block diagram showing a typical printing system for carrying out the features of the preferred embodiment of this invention. Also, this and other printing systems can be modified via the printer controller 14 to incorporate the features of the preferred embodiment of this invention. The printing system shown includes a paper reel 1, splicing table 2, paper drying roll 3, paper cooling 4, paper condition sensor 5, speed motor 6, printing stations 7, top roller 8, fuser 9, paper cooling 10, torque motor 11, cutter 12, and stacker 13. The printing station 7 comprises front and back printing engines for the various colors of ink used by the printer, such as cyan, magenta, yellow, and black. For more colors of ink, additional pairs of print engines would be contained within the printing station. The computer 18 is used to input the color transform table data as described to create a color transform table file, 212.

Using the foregoing specification, the invention may be implemented as a machine, process, or article of manufacture by using standard programming and/or engineering techniques to produce programming software, firmware, hardware or any combination thereof.

Any resulting program(s), having computer readable program code, may be embodied within one or more computer usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer usable medium such as on any memory device or in any transmitting device.

Executing program code directly from one medium, storing program code onto a medium, copying the code from one medium to another medium, transmitting the code using a transmitting device, or other equivalent acts, may involve the use of a memory or transmitting device which only embodies program code transitorily as a preliminary or final step in making, using or selling the invention.

Memory devices include, but are not limited to, fixed (hard) disk drives, diskettes, optical disks, magnetic tape, semiconductor memories such as RAM, ROM, Proms, etc. Transmitting devices include, but are not limited to, the internet, intranets, electronic bulletin board and message/note exchanges, telephone/modem-based network communication, hard-wired/cabled communication network, cellular communication, radio wave communication, satellite communication, and other stationary or mobile network systems/communication links.

A machine embodying the invention may involve one or more printing systems and/or processing systems including, but not limited to, cpu, memory/storage devices, communication links, communication/transmitting devices, servers, I/O devices, or any subcomponents or individual parts of one or more printing systems and/or processing systems, including software, firmware, hardware or any combination or subcombination thereof, which embody the invention as set forth in the claims.

One skilled in the art of computer science will easily be able to combine the software created as described with appropriate general purpose or special purpose computer hardware and/or printer hardware to create a computer/printer system and/or computer/printer subcomponents embodying the invention and to create a computer/printer system and/or computer/printer subcomponents for carrying out the method of the invention.

While the preferred embodiment of the present invention has been illustrated in detail, it should be apparent that modifications and adaptations to that embodiment may occur to one skilled in the art without departing from the spirit or scope of the present invention as set forth in the following claims.

For example, any number of patches can be printed out and measured for its corresponding color value. A certain size matrix or specific percentage values are not required. Also, unequal increments of each color can be utilized, where the increments are based upon piecewise linear steps of each color. Although the invention has been described in terms of L*a*b*, any color values, including device independent color values, can be used. As such, reference to L* can also be optical density or reflectance or other equivalent values. Also, although the invention has been described and claimed in terms of CMYK (which typically refers to cyan, magenta, yellow, and black), other colors can be used for any one or all of these color components. The invention is also applicable to five dimensional to five dimensional conversions, or more, without departing from the spirit and scope of the invention.

We claim:

1. A method for converting externally defined four dimensional colorants into equivalent four dimensional colorants printed by a printer, comprising:

printing a plurality of instances of a fourth component of a four dimensional colorant;

first correlating each of a plurality of fourth components of the externally defined four dimensional colorants to one of the printed fourth components, wherein a first three components of the externally defined and printed four dimensional colorants involved in the first correlation each have zero color value;

printing a plurality of instances of four dimensional colorants having fourth component color values that correlate to one externally defined fourth component according to the first correlation;

second correlating each externally defined four dimensional colorant with one of the printed four dimensional colorants, wherein the fourth components of each pair of correlated externally defined and printed four dimensional colorants correlate according to the first correlation; and using the second correlation to transform any externally defined four dimensional colorant into one printer four dimensional colorant for use by the printer.

2. The method of claim 1, wherein the first correlation is determined by matching a measured color value of one printed fourth component and a color value of one externally defined fourth component.

3. The method of claim 2, wherein the measured color value of the printer fourth component comprises a measured L* value of the printed; fourth component when the first three components have zero color value and the color value of the externally defined fourth component comprises a L*a*b* value when the first three components have zero color value.

4. The method of claim 3, wherein the first correlation further comprises inputting each L* value of the externally defined fourth component and printed; fourth components into an interpolation program, wherein the interpolation program determines an equivalent printer fourth component for each externally defined fourth component.

5. The method of claim 1, wherein determining the second correlation of each externally defined and printer four dimensional colorants further comprises:

determining a measured color value of one printed four dimensional colorant that matches a color value of the externally defined four dimensional colorant, wherein the fourth components of each pair of second correlated externally defined and printed four dimensional colorants that match correlate according to the first correlation, and wherein the second correlation of the printed and externally defined four dimensional colorants is based on the determined matches of the color values.

6. The method of claim 5, wherein an interpolation program receives as input the measured color values of the printed four dimensional components and the color values for the externally defined four dimensional components, and determines a correlation therefrom.

7. The method of claim 1, wherein the fourth component is black.

8. The method of claim 1, wherein the first three components are cyan, magenta, and yellow.

9. The method of claim 1, wherein the second correlation of externally defined and printed four dimensional colorants forms a color transform table for use by the printer in transforming externally defined four dimensional colorants into four dimensional colorants for use by the printer.

10. The method of claim 1, wherein printing a plurality of instances of the fourth component of a four dimensional colorant further comprises printing a series of greyscale fourth colorant patches.

11. The method of claim 1, wherein printing a plurality of instances of the four dimensional colorants further comprises:

for each printed fourth component that correlates to one externally defined fourth component according to the first correlation, printing a plurality of patches at different percentages of the first three components of the four dimensional colorant.

12. A system for converting externally defined four dimensional colorants into equivalent four dimensional colorants printed by a printer, comprising:

means for printing a plurality of instances of a fourth component of a four dimensional colorant;

means for determining a first correlation for each of a plurality of fourth components of the externally defined four dimensional colorants to one of the printed fourth components, wherein a first three components of the externally defined and printed four dimensional colorants involved in the first correlation each have zero color value;

means for printing a plurality of instances of four dimensional colorants having fourth component color values that correlate to one externally defined fourth component according to the first correlation;

means for determining a second correlation for each externally defined four dimensional colorant with one of the plurality of printed four dimensional colorants, wherein the fourth components of each pair of correlated externally defined and printed four dimensional colorants correlate according to the first correlation; and means for using the second correlation to transform any externally defined four dimensional colorant into one printer four dimensional colorant for use by the printer.

13. The system of claim 12, wherein the means for determining the first correlation comprises matching a measured color value of one printed fourth component and a color value of one externally defined fourth component.

14. The system of claim 13, wherein the measured color value of the printed fourth component comprises a measured $L^*$ value of the printed fourth component when the first three components have zero color value and the color value of the externally defined fourth component comprises a $L^*a^*b^*$ value when the first three components have zero color value.

15. The system of claim 14, wherein the means for determining the first correlation further comprises means for inputting each $L^*$ value of the externally defined fourth component and printed fourth components into an interpolation program, wherein the interpolation program determines an equivalent printed fourth component for each externally defined fourth component.

16. The system of claim 12, wherein the means for determining the second correlation of each externally defined and printed four dimensional colorants further comprises:

means for determining a measured color value of one printed four dimensional colorant that matches a color value of the externally defined four dimensional colorant, wherein the fourth components of each pair of second correlated externally defined and printed four dimensional colorants that match correlate according to the first correlation, and wherein the second correlation of the printed and externally defined four dimensional colorants is based on the determined matches of the color values.

17. The system of claim 16, further comprising interpolation program means for receiving as input the measured color values of printed four dimensional components and the color values for the externally defined four dimensional components, and determines a correlation therefrom.

18. The system of claim 12, wherein the fourth component is black.

19. The system of claim 12, wherein the first three components are cyan, magenta, and yellow.

20. The system of claim 12, wherein the second correlation of externally defined and printed four dimensional colorants forms a color transform table for use by the printer in transforming externally defined four dimensional colorants into printed four dimensional colorants.

21. The system of claim 12, wherein the means for printing a plurality of instances of the fourth component of a four dimensional colorant further comprises printing a series of greyscale fourth colorant patches.

22. The system of claim 12, wherein the means for printing the plurality of instances of the four dimensional colorants further comprises:

for each printed fourth component that correlates to one externally defined fourth component according to the first correlation, printing a plurality of patches at different percentages of the first three components of the four dimensional colorant.

23. An article of manufacture for use in programming a printing system to convert externally defined four dimensional colorants into equivalent four dimensional colorants printed by a printer, the article of manufacture comprising a computer usable medium including at least one computer program that causes the printing system to perform:

printing a plurality of instances of a fourth component of a four dimensional colorant;

first correlating each of a plurality of fourth components of the externally defined four dimensional colorants to one of the plurality of printed fourth components, wherein a first three components of the externally defined and printed four dimensional colorants involved in the first correlation each have zero color value;

printing a plurality of instances of four dimensional colorants having fourth component color values that correlate to one externally defined fourth component according to the first correlation;

second correlating each externally defined four dimensional colorant with one of the plurality of printed four dimensional colorants, wherein the fourth components of each pair of correlated externally defined and printed four dimensional colorants correlate according to the first correlation; and using the second correlation to transform any externally defined four dimensional colorant into one printer four dimensional colorant for use by the printer.

24. The article of manufacture of claim 23, wherein the first correlation is determined by matching a measured color value of one printed fourth component and a color value of one externally defined fourth component.

25. The article of manufacture of claim 24, wherein the measured color value of the printed fourth component comprises a measured $L^*$ value of the printed fourth component when the first three components have zero color value and the color value of the externally defined fourth component comprises a $L^*a^*b^*$ value when the first three components have zero color value.

26. The article of manufacture of claim 25, wherein the first correlation further comprises inputting each $L^*$ value of the externally defined fourth component and printed fourth components into an interpolation program, wherein the interpolation program determines an equivalent printed fourth component for each externally defined fourth component.

27. The article of manufacture of claim 23, wherein determining the second correlation of each externally defined and printed four dimensional colorants further comprises:

determining a measured color value of one printed four dimensional colorant that matches a color value of the externally defined four dimensional colorant, wherein the fourth components of each pair of second correlated externally defined and printed four dimensional colorants that match correlate according to the first correlation, and wherein the second correlation of the printed and externally defined four dimensional colorants is based on the determined matches of the color values.

28. The article of manufacture of claim 27, wherein an interpolation program receives as input the measured color values of the printed four dimensional components and the color values for the externally defined four dimensional components, and determines a correlation therefrom.

29. The article of manufacture of claim 23, wherein the fourth component is black.

30. The article of manufacture of claim 23, wherein the first three components are cyan, magenta, and yellow.

31. The article of manufacture of claim 23, wherein the second correlation of externally defined and printed four dimensional colorants forms a color transform table for use by the printer in transforming externally defined four dimensional colorants into four dimensional colorants for use by the printer.

32. The article of manufacture of claim 23, wherein printing a plurality of instances of the fourth component of a four dimensional colorant further comprises printing a series of greyscale fourth colorant patches.

33. article of manufacture of claim 23, wherein printing a plurality of instances of the four dimensional colorants further comprises:

for each printed fourth component that correlates to one externally defined fourth component according to the first correlation, printing a plurality of patches at different percentages of the first three components of the four dimensional colorant.

* * * * *